Jan. 14, 1958  G. A. WOOD, JR., ET AL  2,819,621
VARIABLE PITCH LEAD SCREW MECHANISM
Filed Feb. 14, 1956  4 Sheets-Sheet 3

INVENTORS
GEORGE A. WOOD, JR.
DOUGLAS P. ROHRER
BY
ATTORNEYS

Jan. 14, 1958 G. A. WOOD, JR., ET AL 2,819,621
VARIABLE PITCH LEAD SCREW MECHANISM
Filed Feb. 14, 1956 4 Sheets-Sheet 4

INVENTORS
GEORGE A. WOOD, JR.
DOUGLAS P. ROHRER
BY

ATTORNEYS

United States Patent Office 2,819,621
Patented Jan. 14, 1958

2,819,621

VARIABLE PITCH LEAD SCREW MECHANISM

George A. Wood, Jr., South Lincoln, and Douglas P. Rohrer, Lexington, Mass., assignors to Arthur D. Little, Inc., Cambridge, Mass., a corporation of Massachusetts Application February 14, 1956, Serial No. 565,346

9 Claims. (Cl. 74—99)

This invention relates to a machine tool of the type having a uniform linear feed mechanism operating in conjunction with a cutting instrumentality such as a tap, die or the like, and as illustrative of its utility the invention is herein shown as embodied in an automatic tapping machine.

Conventional machines of this type usually embody a plurality of interchangeable lead screws and their companion cutting instrumentalities, such as taps, dies, etc., and when varying the operation such, for example, as changing the pitch of a thread, it is necessary to substitute a selected lead screw and its companion tap or die. In machines employing but a single lead screw, the pitch of a thread or rate of feed is controlled by the use of interchangeable gears or the like, but here again changing from one pitch or rate of feed to another requires the substitution of a new set of gears and their companion taps, dies or the like. Hence, such changes are not only time consuming, but a fully equipped machine must include numerous lead screws or sets of gears which add appreciably to the cost.

The principal objects of the present invention are to provide a machine of the aforesaid type which embodies but a single lead screw operating in conjunction with an adjustable mechanism by means of which the pitch or feed may be varied in a manner of a few seconds, and to provide a machine which is efficient and reliable in operation and capable of cutting or forming threads with the desired degree of precision.

Further objects relate to features of construction and will be apparent from a consideration of the following description and the accompanying drawings, wherein.

Figure 1:
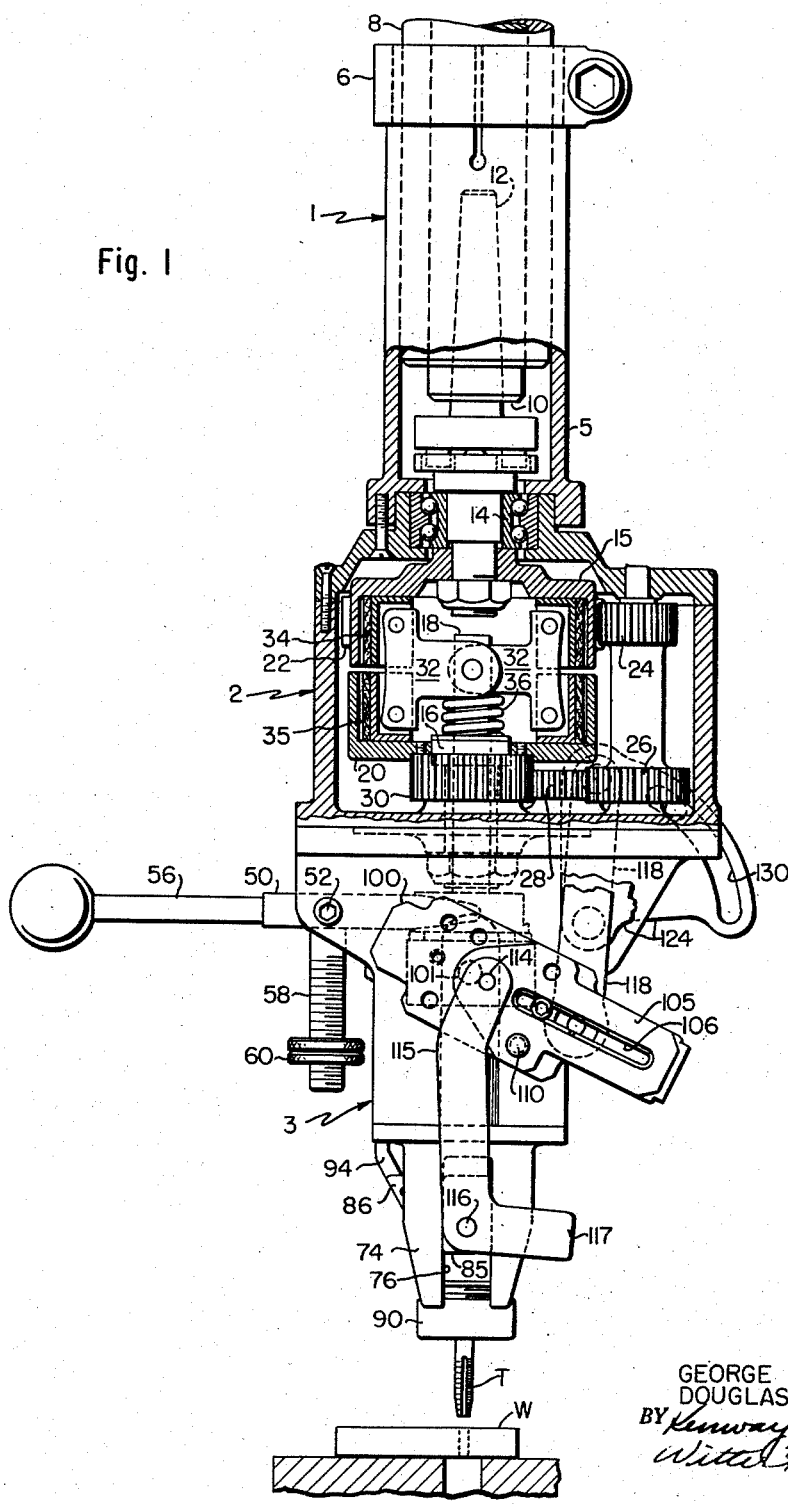
Fig. 1 is an elevation, with parts broken away and shown in section, of a tapping machine constructed in accordance with the present invention, the parts being shown in a position to produce a relatively fine thread.

In accordance with the present invention we provide a machine tool of the aforesaid type which comprises a frame or housing within which are male and female threaded members, one of which is rotatably mounted and the other axially movable along the first in response to relative rotation. Any suitable driving means such as a reversible motor, a reversible clutch mechanism connected with a driving arbor or spindle, or the equivalent, may be provided to effect relative rotation and consequent axial movement of one of the threaded members. A holder for an operating instrumentality such as a tap, die or the like, is suitably supported by the frame for axial and rotary movement, and to this end the holder may be connected with the driving means by a spline or the like which may extend through the threaded members and axial movement of the holder is effected by a rocker arm associated with the axially movable threaded member and a driving link or equivalent means effective to transmit axial movement of the threaded member to the holder.

Restraint is applied to the rocker arm at a point spaced from or offset with respect to its pivotal support or connection so that the rocker arm undergoes pivotal movement in response to axial movement of the threaded member. Unless the pivotal connection between the holder and rocker arm aligns or coincides with the axis of the rotation of the threaded members the rate of axial movement of the holder will be non-linear and provision must be made to compensate for such non-linear rate by means which act on the rocker arm so as to induce a rate of axial movement of the holder which movement is dependent on the motion induced by the rocker arm on the driving link, thus "neutralizing the error" inherent in the system when the parts are not truly aligned or in "dead center" position.

Such compensating means may comprise a link connected with the rocker arm and arranged to pivot about a fixed point, a guide slot, cam means or the like, all of which are capable of acting on the rocker arm to restrain its movements so as to induce an axial component equal to and opposite that error which would otherwise be induced by the rocker arm on the holder. Consequently, the end result is a linear rate of axial movement of the holder which is necessary properly to form threads of uniform pitch.

In addition to the compensating feature above described, we provide an efficient and reliable means whereby the pitch or lead may be quickly changed together with such changes in compensation as are necessary. To this end the rocker arm comprises two lengthwise adjustable sections, one of which is connected with the holder and the other section is connected with the axially movable threaded member and compensating means which include a link or the equivalent having one end adjustably connected to one of a plurality of fixed points on the frame corresponding to the effective length of the rocker arm. Hence, simply by adjusting the length of the rocker arm and making a corresponding adjustment of the fixed end of the compensating link or its equivalent, the rate of feed or pitch of the threads to be formed may be quickly changed.

Other features of the invention include adjustable means for limiting the axial movement of the holder so that the proper depth of threads may be automatically attained, and also means for returning or effecting reverse movement of the holder and automatically cutting off the driving mechanism when the parts are restored to retracted position.

Referring to the accompanying drawings, particularly Fig. 1, the machine tool shown therein is designed for use with a conventional drill press equipped with a chuck for a Morse tapered shank, and the machine comprises a frame or casing having an upper section or housing 1 which receives the drill press bushing and spindle, an intermediate section or housing 2 within which is a reversible clutch mechanism, and a lower section 3 which carries the lead screw and associated parts.

The section 1 comprises a cylindrical sleeve 5, the upper end of which is split and carries a clamping ring 6 which firmly locks the mechanism to the depending bushing 8 within which is the driving spindle 10 of the drill press. A tapered shank 12, rotatably mounted within the section 1, extends into the chuck portion formed in the end of the spindle 10 and the lower part of this shank is formed with an extension supported by antifriction bearings 14 carried by the upper end of the section 2.

The lower end of the shank 12 is connected to an inverted cap-like shell 15 constituting a part of the reversible clutch. Although various types of clutches may be used the clutch herein shown is a Jarvis Torquomatic which is more fully shown in Catalog TMT-1 of the Jarvis Corporation, to which reference may be had for a more detailed disclosure than is here set forth.

Slidably mounted within a spindle bushing 16 is a transmission shaft 18 and secured about the upper part of the bushing 16 is a reversible shell 20 coaxial with the shell 15 and bushing 16. Secured to the periphery of the shell 15 is a drive gear 22 meshing with a pinion gear 24 mounted on a stud 25 which is secured to the upper and lower walls of the section. The pinion 24 is integrally connected with a pinion 26 meshing with an idler gear 28 which drives reverse gear 30 secured to the underside of the shell 20.

The upper end of the shaft 18 is pivotally connected with the legs of oppositely extending T-links 32, the upper arms of which are connected to an annular clutch shoe 34 and the lower arms are connected to an annular clutch shoe 35. A compression spring 36 seated on the upper end of the bushing 16 acts against the T-links 32 so as normally to hold them in neutral position, i. e., with clutch shoes 34 and 35 out of contact with the shells 15 and 20. In operation the shell 15 is at all times driven clockwise and the shell 20 is driven counterclockwise at approximately twice the speed of the shell 15. When the shaft 18 is raised to bring the clutch shoe 34 into driving engagement with the shell 15, the shaft 18 rotates clockwise and when the shaft is shifted to lowermost position the shoe 34 disengages the shell 15, but the shoe 35 engages the shell 20 to drive the shaft 18 counterclockwise.

Figure 3:
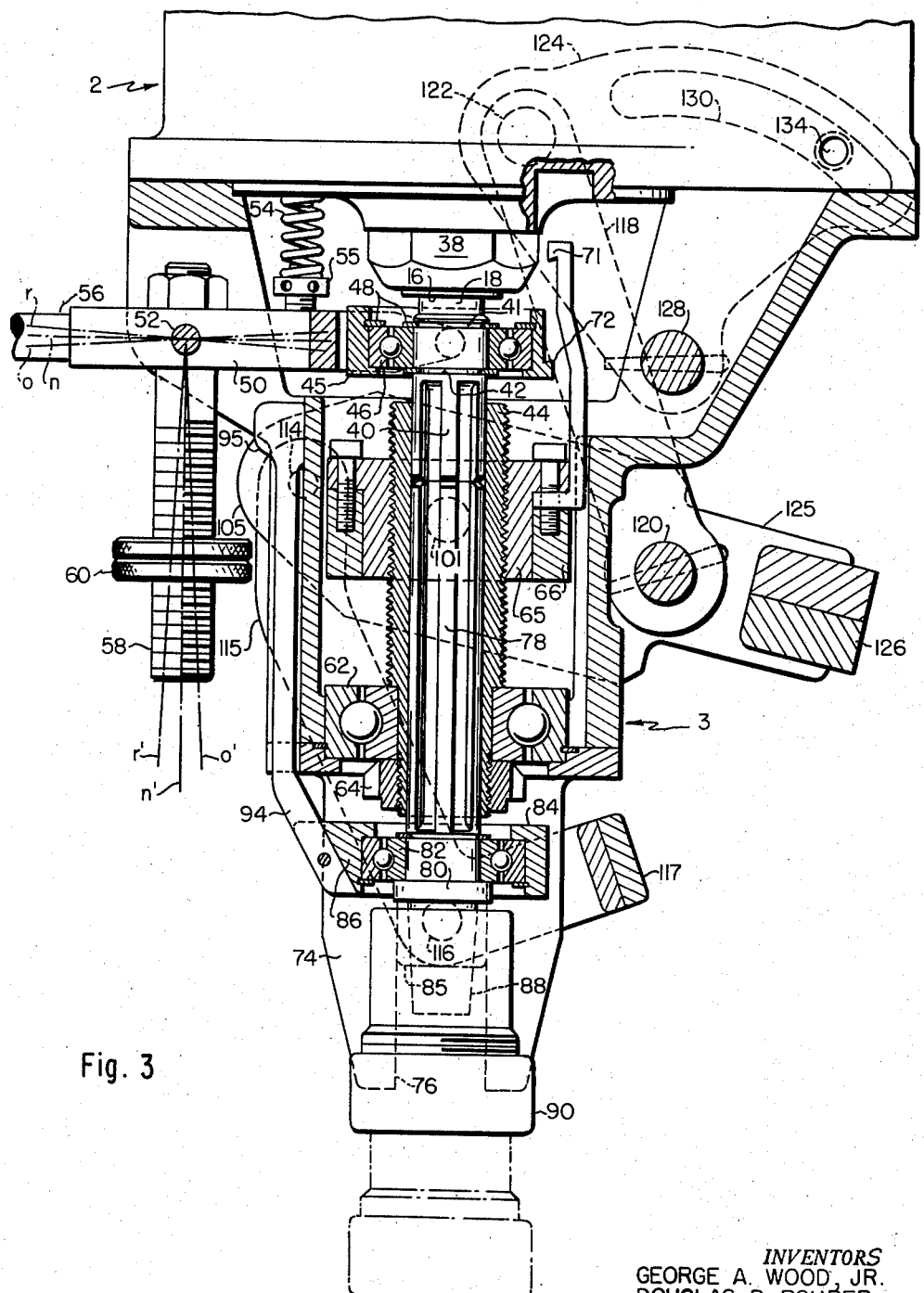
Fig. 3 is a vertical section through the mechanism shown in Fig. 2.

Referring to Fig. 3, the bushing 16 and shaft 18 extend into the lower section 3, the end of the bushing being secured in place by a nut 38. The lower end of shaft 18 is provided with an integral extension 40 formed with spaced circumferential grooves 41 and 42, beneath which the extension is splined to fit within the splined tubular lead screw 44. Circumposed about the extension 40 is a clutch drive ring 45 which carries an antifriction bearing 46 snugly fitting about the extension between the grooves 41 and 42, the parts being held in position by retainer rings 48.

The forked end of a clutch drive arm 50 is pivotally connected with the drive ring 45 and this arm projects outwardly, being pivotally supported by the pin 52 secured to the upper part of section 3. A biasing spring 54 acts on a screw 55 carried by the arm 50 so as to cooperate with spring 36 (Fig. 1) in holding the clutch in neutral position, but if desired the spring 54 may be so loaded by adjusting the screw 55 as normally to hold the clutch shoe 34 in engagement with the shell 20 for the purpose hereinafter pointed out. The outer end of arm 50 is connected to a drive lever 56 and at its pivotal connection 52 the arm is secured to a depending depth adjusting screw 58 which carries an index nut 60, the construction and arrangement of parts being such that when the lever 56 is swung downwardly the screw 58 and index nut 60 swing inwardly into operative position, as hereinafter explained.

The lower end of the lead screw 44 is reduced to fit an antifriction bearing 62 mounted in the lower end of the section 3, and a nut 64 firmly anchors the end of the screw in position. A lead nut 65 is carried by the screw 44 and is secured to a lead nut bracket 66 formed with diametrically extending lugs 68 which project into vertical slots or guideways 70 (Fig. 2) in the walls of the housing. Secured to the bracket 66 is an upwardly extending clutch throw-out arm 71 (Fig. 3), the upper end of which is hooked so as to engage the notched portion 72 formed in the periphery of the clutch ring 45.

Secured to the lower end of section 3 is a chuck support 74 formed with diametrically disposed vertically extending guideways 76 and a lateral opening vertically aligned with the arm 50. Slidable within the lead screw 44 is a splined drive shaft 78, the lower end of which is formed with an annular flange 80 on which is seated the inner race of an antifriction bearing 82. A chuck guide 84 is slidably mounted within the chuck support and its flanged inner periphery embraces the outer race of the bearing 82, thus firmly supporting the lower part of the drive shaft 78. The chuck guide is formed with diametrically disposed depending lugs 85 which snugly fit the guideways 76 and spaced ears 86 diametrically aligned with the lateral opening in the chuck support.

Below the flange 80 the drive shaft is formed with a tapered extension 88 (Fig. 3) which fits into a standard chuck 90, such as a Jacobs No. 440-02. This chuck carries an operating instrumentality, here shown as a standard tap T (Fig. 1). Mounted between the ears 86 of the chuck guide 84 is an upwardly extending arm 94 aligned with the arm 50 and screw 58, and the upper end of this guide arm is formed with an outwardly extending cam member 95 engageable with the index nut 60 when the screw 58 is swung inwardly and operative either to throw the arm 50 back to neutral position or to reverse position.

The operation of the mechanism thus far described is that when the lever 56 is swung downwardly to feeding or advance position, indicated by the line o in Fig. 3, a driving connection is established between the shell 15 and chuck 90 which causes the screw 44 and the driven shaft 78 to rotate clockwise, whereupon the lead nut 65 and associated parts travel downwardly until the throw-out arm 71 engages the notched portion 72 to swing the arm 50 either back to neutral or reverse position, as indicated by the lines n and r, respectively. Since there is no connection between the feed nut and chuck, apart from those presently to be described, no axial movement is induced by the feed nut, although it is to be understood that the shaft 78, chuck guide 84 and parts carried thereby are axially movable toward and away from the work W (Fig. 1).

Axial movement of the chuck and associated parts is effected by linkage system comprising two interconnected identical sections, each being symmetrically arranged to provide a "mirror image" of the other. Accordingly, a detail description of but one section will suffice.

Figure 2:
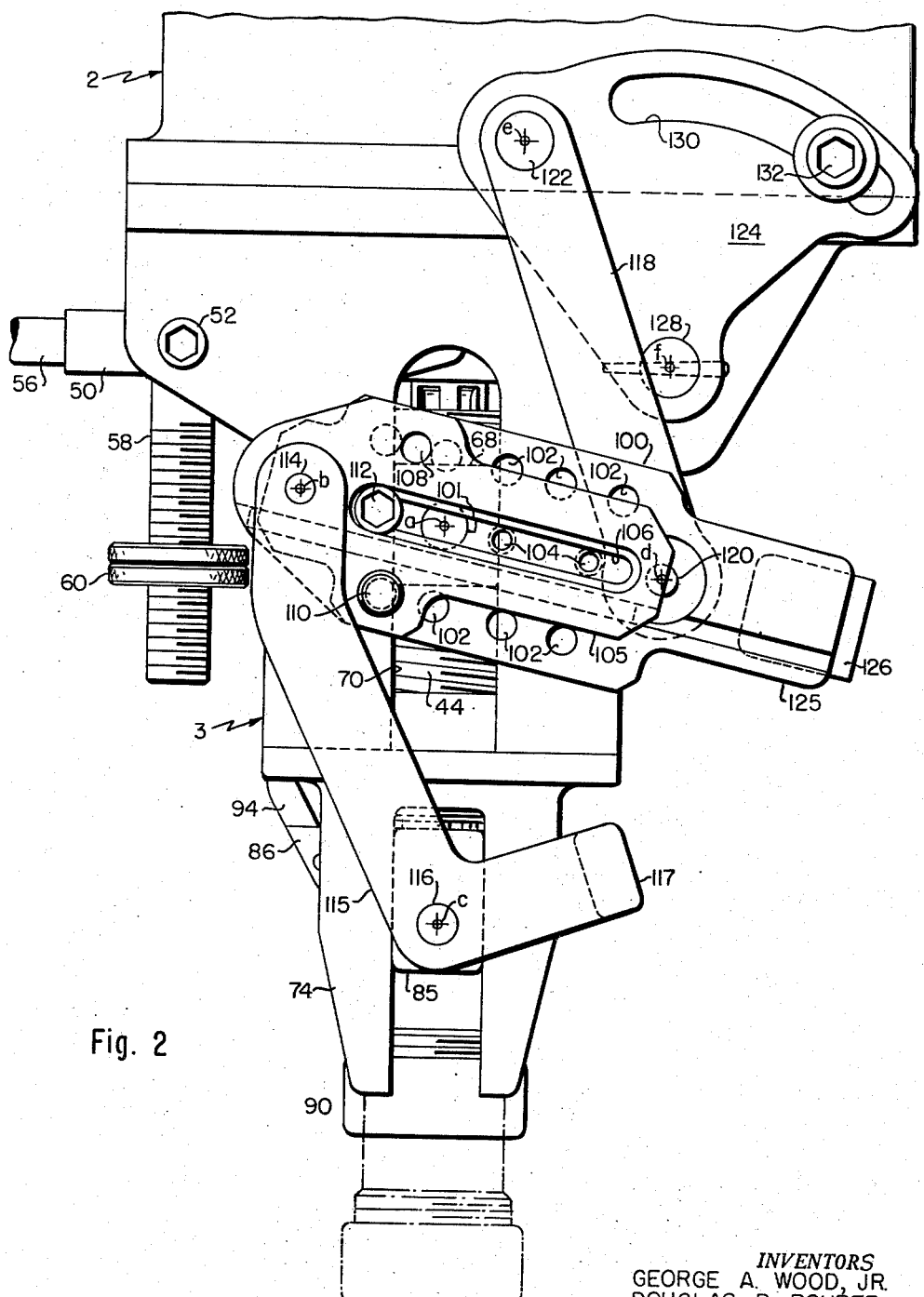
Fig. 2 is an enlarged elevation showing the adjustable feed mechanism and associated compensating means, the parts being shown in a position to produce a relatively coarse thread.
Figure 5:
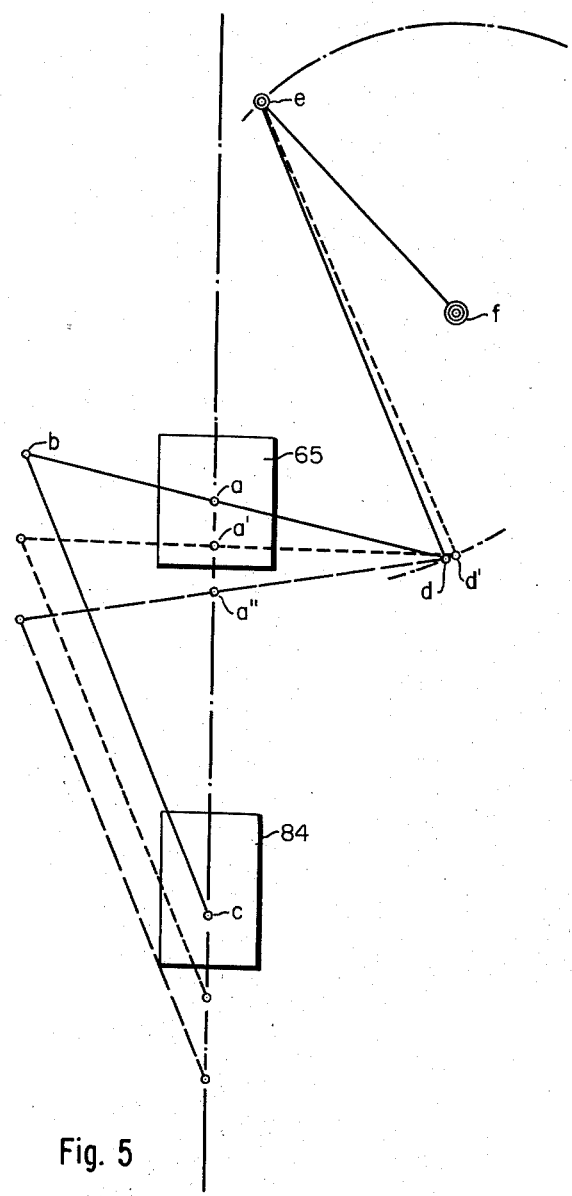
Fig. 5 is a view similar to Fig. 4, but showing the parts corresponding to Fig. 2.
Figure 4:
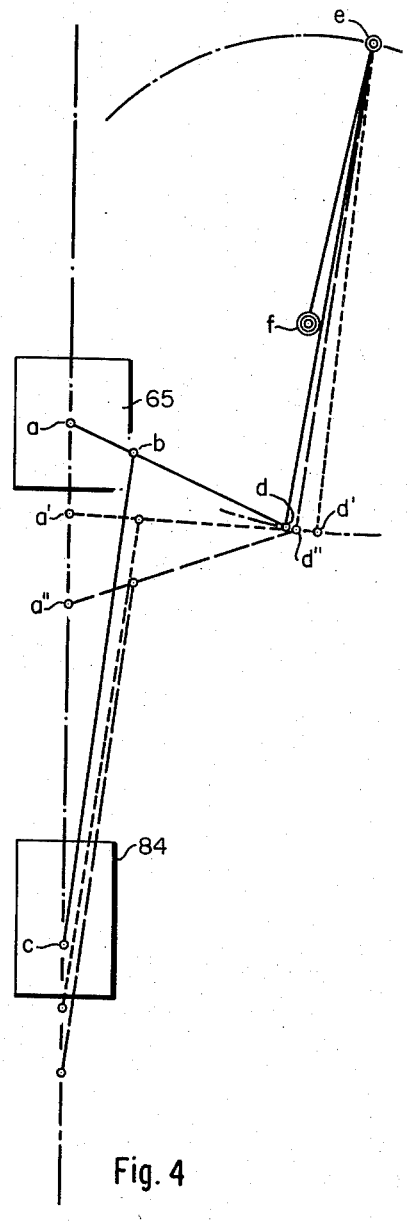
Fig. 4 is a diagrammatic illustration of the linkage system and associated parts embodied in the feeding mechanism and compensating means, the parts being shown to correspond with Fig. 4.

Referring to Figs. 1 to 3, the inner section 100 of a two piece rocker arm is provided with a pin 101 which projects inwardly into an opening in the adjacent lug 58 (Fig. 2) of the feed nut bracket 66, thereby supporting the rocker arm for pivotal movement about a point hereinafter referred to as point a (Figs. 2, 4 and 5). The body of this section along its opposite marginal portions is provided with a plurality of index openings 102 which are preferably bushed and arranged to correspond with the pitch of a thread to be cut, and between these openings on each side of the pin 101 are threaded clamping screw openings 104.

The outer section 105 of the rocker arm is formed with an elongate slot 106 aligned with the openings 104 and index openings 108 (Fig. 2) adapted to register with those of the inner section 100. An index pin 110 projects through one of the openings 108 into a selected index opening 102 in the inner section and a clamping screw 112 projects through the slot 106 into one of the openings 104 firmly to clamp the two sections together. If desired, the contiguous faces of the sections 100 and 105 may be formed with interfitting ways or the like to insure a precise adjustment in the effective length of the rocker arm.

Pivotally connected by a pin 114 to one end of the outer section 105 is a depending driving link 115, the lower end of which is pivotally connected by pin 116 to the lugs 85 of the chuck guide 84, the pivotal connection with the rocker arm and chuck guide being hereinafter referred to as movable points $b$ and $c$ (Figs. 2, 4 and 5). The lower end of the drive link 115 is connected with a U-shaped extension 117 adjoining the companion link on the diametrically opposite side of the frame or housing, thus insuring that both links are simultaneously adjusted to the same setting. The lower end of a compensating link 118 is pivotally connected by pin 120 to one end of the section 100 and its upper end is pivotally connected by pin 122 to the upper corner of a sector plate 124, these movable pivotal connections defined by the pins 120 and 122 being hereinafter referred to as points $d$ and $e$. Here again the rigidity of the mechanism and its operation may be enhanced by extending the pivot 120 rearwardly to provide a single pivotal support for both compensating links 118, and in addition the ends of the inner sections 100 of the rocker arms are formed with tail pieces 125 which project outwardly beyond the pivot pin 120 and are rigidly connected by cross pieces 126.

The lower corner of the sector plate 124 is pivotally connected by pin 128 to the frame or housing and here again the pin 128 extends rearwardly to provide the pivotal support for the corresponding sector plate on the opposite side of the housing. The pivotal connection provided by pin 128 is hereinafter referred to as fixed point $f$ (Figs. 2, 4 and 5). In order to effect compensation for the different settings for the rocker arm the sector plate may be adjusted to assume a position corresponding to the setting of the section 105 on the section 100 of the rocker arm and to this end it is formed with an arcuate slot 130 through which a clamping screw 132 (Fig. 2) projects into a threaded opening 134 (Fig. 3) in the housing section.

In the embodiment herein shown the inner section 100 of the rocker arm is provided with nine staggered index openings 102 so arranged that the effective length of the rocker arm may be varied to produce any one of nine different leads or pitches, and the sector plate may be indexed to show the nine positions corresponding to those of the rocker arm. Since the leverage on the drive links 115, and hence the rate of feed of the chuck, is greater when the parts are as shown in Fig. 2 than when they are as in Fig. 1, it follows that in the former position coarser threads will be cut than when in the latter; and for intermediate positions the rate of feed, and hence the pitch of the threads, will vary in accordance with the effective length of the rocker arm.

Referring to Figs. 2 and 5, it will be noted that the effective length of the rocker arm is represented by the line $b$—$a$—$d$ and the length of the driving link 115 is represented by the line $b$—$c$. If the point $d$ were fixed it is obvious that for a linear rate of travel of the nut 65, the rate of feed of the chuck guide 84 would be nonlinear due to angularity; but where, as here shown, the point $d$ is movable in a predetermined arcuate path due to the action of the compensating link 118, represented by the line $d$—$e$, the movements of the rocker arm are so restrained or modified as to induce an axial component equal to and opposite that which would otherwise be induced by the rocker arm on the chuck guide 84. This is illustrated in Fig. 5, wherein the rate of travel of feed nut 65 and that of the chuck guide 84 are linear, although due to leverage the distance traveled by the chuck guide 84 is greater than that of the feed nut 65.

Referring to Figs. 1 and 4, it will be noted that the section 105 is adjusted so as to produce a relatively fine thread and such adjustment is illustrated in Fig. 4, wherein the line $a$—$b$—$d$ represents the effective length of the rocker arm. Here again if the point $d$ were fixed, a nonlinear rate of feed of the chuck 90 would result, but by swinging the sector plate clockwise to bring point $e$ in position to be effective properly to compensate for the nonlinear rate of feed that would otherwise be produced, the movements of the rocker arm are so restrained and modified as to effect the proper compensation, as illustrated in Fig. 4. It will be observed from a study of Figs. 4 and 5 that as the point $a$ travels from position $a$ to a position $a'$ the point $d$ travels to position $d'$ and the point $a$ in traveling from position $a'$ to $a''$ effects a reverse movement of the point $d$, the extent of which movement is governed by the effective length of the rocker arm.

A summary of the operation of the machine is as follows: Assuming that the machine has been attached to the bushing 8 of a drill press, as shown in Fig. 1, that the proper tap T has been secured in the chuck 90, and that a piece of work W that has been predrilled is set beneath the tap T, the section 105 is first properly adjusted and locked to section 100 so as to produce the desired lead or pitch and the sector plates 124 are set to correspond with the setting of the rocker arms. The handle 56 is swung upwardly so as to raise the feed nut 65 to its uppermost position and the index nut 60 is then set to correspond with the depth of the tapped hole to be produced. The operator swings the handle or operating lever 56 downwardly to operating position, indicated by the dot and dash line $o$ (Fig. 3), whereupon the index screw 58 swings inwardly to position $o'$. As the chuck guide 84 and parts carried thereby travel downwardly the tap enters the drilled hole in the work W and when the proper depth has been reached the cam 95 engages the index nut 60 so as to swing the arm 50 back to neutral position. The operator then swings the lever 56 upwardly, thereby reversing the rotation of the lead screw 44 and causing the lead nut 66, drive shaft 78 and chuck guide 84 to travel upwardly. Such upward movement continues until the drive shaft 78 engages the extension 40, whereupon the shaft 18 is moved upwardly so as to swing the arm from reverse position, indicated by the lines $r$ and $r'$ back to neutral position indicated by the lines $n$ and $n'$ in Fig. 3.

In changing from one size thread to another it is merely necessary to readjust the section 100 on section 105 and swing the sector plate 124 to the corresponding position. Since this procedure requires the loosening of the pin 110 and the clamping screws 112 and 132, then sliding the section 105 lengthwise of the section 100 and the replacement of the pin and screws, the necessary adjustments may be accomplished in less than a minute. Since no operating parts such as gears or lead screws need to be replaced, there is no danger of misplacing necessary operating parts or making the wrong substitution before becoming aware of the mistake.

While we have shown and described one desirable embodiment of the invention it is to be understood that this disclosure is for the purpose of illustration and that various changes and modifications may be made without departing from the spirit and scope of the invention as set forth in the appended claims.

We claim:

1. In a machine tool of the class described having a frame, male and female threaded members, one of which is rotatably supported by said frame so that the other of said members moves axially in response to rotation of the first, a reversible driving means for rotating the rotatable member, a holder supported by said frame for rotary and axial movement, and a rotary driving connection between said holder and reversible driving means, mechanism operative to move said holder axially at a predetermined linear rate different from that of the movable threaded member, said mechanism comprising a rocker arm, a driving link pivotally connected at opposite ends with said arm and said holder, said arm being pivotally supported by the movable threaded member at one side of its connection with said link so as to undergo pivotal movement in response to axial movement of the movable threaded member, and compensating means carried by said frame and acting on said arm at one side of its pivotal connection with said movable threaded member so as to induce a rate of axial movement of said holder which movement is dependent on the motion induced by said arm on said driving link.

2. In a machine tool of the class described having a frame, male and female threaded members, one of which is rotatably supported by said frame so that the other of said members moves axially in response to rotation of the first, a reversible driving means for rotating the rotatable member, a holder supported by said frame for rotary and axial movement, and a rotary driving connection between said holder and reversible driving means, mechanism operative to move said holder axially at a predetermined linear rate different from that of the movable threaded member, said mechanism comprising a rocker arm, a driving link pivotally connected at opposite ends with said arm and said holder, said arm being pivotally supported by the movable threaded member at one side of its connection with said link so as to undergo pivotal movement in response to axial movement of the movable threaded member, and a compensating link pivotally connected at one end to said arm at one side of its pivotal connection with said movable threaded member and at its opposite end to a fixed point on said frame so as to induce a rate of axial movement of said holder which movement is dependent on the motion induced by said arm on said driving link.

3. A machine tool as set forth in claim 2, wherein said rocker arm comprises two relatively adjustable sections, one section being connected with said driving link and the end of the other section being connected with said compensating link.

4. A machine tool as set forth in claim 3, wherein the opposite end of said compensating link is adjustably connected to one of a plurality of fixed points on said frame corresponding to the effective length of said arm.

5. A machine as set forth in claim 4, wherein said opposite end of said compensating link is pivotally connected to a sector plate which is pivotally mounted on said frame, and releasable locking means are provided for holding said plate at a selected position corresponding to the effective length of said arm.

6. In a machine tool of the class described, having a frame, a screw rotatably supported within said frame, a lead nut carried by said screw so as to move axially in response to rotation of said screw, reversible driving means connected with said screw, a holder coaxial with said screw and supported by said frame for rotary and axial movement, and a rotary driving connection between holder and driving means, mechanism operative to move said holder axially at a predetermined linear rate different from that of said lead nut, said mechanism comprising a rocker arm pivotally supported by said lead nut, a driving link pivotally connected at opposite ends with said holder and said arm at a point offset with respect to its pivotal support, and a compensating link pivotally connected at one end to said arm at one side of its pivotal connection with said lead nut and at its opposite end to a fixed point on said frame so as to induce a rate of axial movement of said holder which movement is dependent on the motion induced by said arm on said driving link.

7. In a machine tool of the class described having a frame, a screw rotatably supported within said frame, a lead nut carried by said screw so as to move axially in response to rotation of said screw, reversible driving means connected with said screw, a holder supported by said frame for rotary and axial movement, and a rotary driving connection between said holder and driving means, mechanism operative to move said holder axially at a predetermined linear rate different from that of said lead nut, said mechanism comprising a lengthwise adjustable rocker arm pivotally supported by said lead nut, a driving link pivotally connected at opposite ends with said holder and said arm at a point offset with respect to its pivotal support, and a compensating link pivotally connected at one end to said arm at one side of its pivotal connection with said lead nut and at its opposite end to one of a plurality of fixed points on said frame corresponding to the effective length of said arm so as to induce a rate of axial movement of said holder which movement is dependent on the motion induced by said arm on said driving link.

8. In a machine tool of the class described having a frame, a screw rotatably supported within said frame, a lead nut carried by said screw so as to move axially in response to rotation of said screw, reversible driving means connected with said screw, and a rotatable holder coaxial with said screw and slidably mounted in said frame for axial movement, mechanism operative to move said holder axially at a predetermined linear rate different from that of said lead nut, said mechanism comprising a driving spline extending through said screw and connecting said driving means and holder, a rocker arm pivotally connected with said lead nut, a driving link pivotally connected at opposite ends with said holder and said arm at a point offset with respect to its pivotal connection with said lead nut, and a compensating link connected at one end with said arm at one side of its pivotal connection with said movable threaded member and at its opposite end with a fixed point on said frame so as to induce a rate of axial movement of said holder dependent on the motion induced by said arm on said driving link.

9. In a machine tool of the class described having a frame, a screw rotatably supported within said frame, a lead nut carried by said screw so as to move axially in response to rotation of said screw, reversible driving means connected with said screw, a rotatable holder for an operating instrumentality slidably mounted in said frame for axial movement, and a rotary driving connection between said driving means and holder, mechanism operative to move said holder axially at a predetermined linear rate different from that of said lead nut, said mechanism comprising a rocker arm pivotally connected with said lead nut, said arm having two lengthwise adjustable sections, a driving link pivotally connected at opposite ends with said holder and one of said sections, a sector plate pivotally mounted on said frame, a compensating link pivotally connected at one end with said sector plate at a point spaced from its pivotal with said frame and at its opposite end connected with the other of said sections at one side of the pivotal connection with said lead nut, and releasable locking means for holding said plate at a selected angular position corresponding to the effective length of said arm so as to induce a rate of axial movement of said holder which movement is dependent on the motion induced by said arm on said driving link.

References Cited in the file of this patent
UNITED STATES PATENTS

| 1,831,490 | Gerling | Nov. 10, 1931 |
| 2,318,814 | Strong | May 11, 1943 |
| 2,617,307 | Drissner | Nov. 11, 1952 |